US008732153B1

(12) United States Patent
Baluja et al.

(10) Patent No.: US 8,732,153 B1
(45) Date of Patent: May 20, 2014

(54) IDENTIFYING RELATED QUERIES

(75) Inventors: Shumeet Baluja, Leesburg, VA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/616,893

(22) Filed: Sep. 14, 2012

Related U.S. Application Data

(63) Continuation of application No. 13/219,076, filed on Aug. 26, 2011, now Pat. No. 8,515,935, which is a continuation of application No. 11/756,127, filed on May 31, 2007, now Pat. No. 8,019,742.

(51) Int. Cl.
*G06F 7/00* (2006.01)
*G06F 17/30* (2006.01)

(52) U.S. Cl.
USPC .............. 707/706; 707/721; 707/751; 706/58

(58) Field of Classification Search
USPC ........................................................ 707/706
See application file for complete search history.

(56) References Cited

U.S. PATENT DOCUMENTS

| | | | |
|---|---|---|---|
| 5,544,281 A | | 8/1996 | Maruoka et al. |
| 5,563,960 A | * | 10/1996 | Shapiro ..................... 382/239 |
| 5,745,392 A | * | 4/1998 | Ergas et al. .................. 708/203 |
| 5,746,392 A | | 5/1998 | Gast |
| 5,748,851 A | | 5/1998 | Iokibe et al. |
| 5,841,890 A | * | 11/1998 | Kraske ......................... 382/131 |
| 5,952,957 A | * | 9/1999 | Szu ................................ 342/53 |
| 5,987,457 A | | 11/1999 | Ballard |
| 6,006,225 A | | 12/1999 | Bowman et al. |
| 6,212,524 B1 | | 4/2001 | Weissman et al. |
| 6,236,684 B1 | * | 5/2001 | Wu .......................... 375/240.19 |
| 6,240,409 B1 | | 5/2001 | Aiken |
| 6,353,825 B1 | | 3/2002 | Ponte |
| 6,356,899 B1 | | 3/2002 | Chakrabarti et al. |
| 6,460,029 B1 | | 10/2002 | Fries et al. |
| 6,463,426 B1 | | 10/2002 | Lipson et al. |
| 6,484,162 B1 | | 11/2002 | Edlund et al. |
| 6,516,312 B1 | | 2/2003 | Kraft et al. |
| 6,532,307 B1 | | 3/2003 | Sato |
| 6,701,309 B1 | | 3/2004 | Beeferman et al. |
| 6,701,310 B1 | | 3/2004 | Sugiura et al. |
| 6,760,724 B1 | | 7/2004 | Chakrabarti et al. |
| 7,200,584 B2 | | 4/2007 | Sakurai |
| 7,292,634 B2 | | 11/2007 | Yamamoto et al. |
| 7,296,011 B2 | | 11/2007 | Chaudhuri et al. |
| 7,296,014 B1 | * | 11/2007 | Gilbert et al. .......... 707/999.004 |
| 7,356,171 B2 | | 4/2008 | Werthiem et al. |

(Continued)

OTHER PUBLICATIONS

Chien et al, "Semantic Similarity Between Search Engine Queries Using Temporal Correlation"; May 10-14, 2005; published by ACM for WWW 05, proceedings of the 14th International Conference on World Wide Web; pp. 2-11.*

(Continued)

*Primary Examiner* — Pavan Mamillapalli
(74) *Attorney, Agent, or Firm* — Fish & Richardson P.C.

(57) ABSTRACT

A method includes receiving search queries. Images are generated that represent the volume of each search query relative to all search queries over a period of time. The images are processed to generate wavelets for each image. Related queries having similar increases or decreases in volume are identified by comparing at least some of the wavelets corresponding to a first query to wavelets corresponding to other queries.

18 Claims, 7 Drawing Sheets

(56) References Cited

U.S. PATENT DOCUMENTS

| | | | |
|---|---|---|---|
| 7,571,162 B2 | 8/2009 | Sun et al. | |
| 7,580,813 B2 | 8/2009 | Thiesson et al. | |
| 7,752,557 B2 | 7/2010 | Hoeber et al. | |
| 7,756,855 B2 | 7/2010 | Ismalon | |
| 7,792,769 B2 | 9/2010 | Kant et al. | |
| 7,840,579 B2 | 11/2010 | Samuelson et al. | |
| 7,885,911 B2 * | 2/2011 | Cormode et al. | 706/46 |
| 7,912,823 B2 | 3/2011 | Ferrari et al. | |
| 8,005,813 B2 | 8/2011 | Chowdhury et al. | |
| 8,019,742 B1 | 9/2011 | Baluja et al. | |
| 8,024,337 B1 | 9/2011 | Baluja et al. | |
| 8,386,454 B2 | 2/2013 | Haas et al. | |
| 2002/0019763 A1 | 2/2002 | Linden et al. | |
| 2002/0194166 A1 | 12/2002 | Fowler | |
| 2003/0088554 A1 | 5/2003 | Ryan et al. | |
| 2003/0110163 A1 | 6/2003 | Chen et al. | |
| 2003/0172063 A1 | 9/2003 | Gutta et al. | |
| 2003/0212760 A1 | 11/2003 | Chen et al. | |
| 2004/0254920 A1 | 12/2004 | Brill et al. | |
| 2005/0102259 A1 | 5/2005 | Kapur | |
| 2005/0161542 A1 | 7/2005 | Theut | |
| 2006/0010126 A1 | 1/2006 | Anick et al. | |
| 2006/0026152 A1 | 2/2006 | Zeng et al. | |
| 2006/0104484 A1 | 5/2006 | Bolle et al. | |
| 2006/0110043 A1 | 5/2006 | Reissman | |
| 2006/0112085 A1 | 5/2006 | Zijlstra et al. | |
| 2006/0161542 A1 | 7/2006 | Cucerzan et al. | |
| 2006/0195443 A1 | 8/2006 | Franklin et al. | |
| 2006/0277210 A1 | 12/2006 | Starbuck | |
| 2007/0050351 A1 | 3/2007 | Kasperski et al. | |
| 2007/0162422 A1 | 7/2007 | Djabarov | |
| 2007/0239713 A1 | 10/2007 | Leblang et al. | |
| 2007/0260635 A1 | 11/2007 | Ramer et al. | |
| 2007/0271255 A1 | 11/2007 | Pappo | |
| 2008/0027918 A1 | 1/2008 | Altevogt et al. | |
| 2008/0147638 A1 | 6/2008 | Hoeber et al. | |
| 2008/0288489 A1 | 11/2008 | Kim | |
| 2009/0144262 A1 | 6/2009 | White et al. | |
| 2009/0193352 A1 | 7/2009 | Bunn | |
| 2009/0248397 A1 | 10/2009 | Garcia et al. | |
| 2009/0287680 A1 | 11/2009 | Paek et al. | |
| 2010/0104158 A1 | 4/2010 | Shechtman et al. | |
| 2010/0106703 A1 | 4/2010 | Cramer | |
| 2010/0131484 A1 | 5/2010 | Gosse et al. | |
| 2010/0138400 A1 | 6/2010 | Curtis et al. | |
| 2010/0145678 A1 | 6/2010 | Csomai et al. | |
| 2010/0145940 A1 | 6/2010 | Chen et al. | |
| 2010/0169300 A1 | 7/2010 | Liu et al. | |
| 2010/0205172 A1 | 8/2010 | Luk | |
| 2010/0287149 A1 | 11/2010 | Joshi | |
| 2010/0287175 A1 | 11/2010 | Beaudreau et al. | |
| 2011/0047136 A1 | 2/2011 | Dehn | |
| 2011/0252030 A1 | 10/2011 | Spangler | |
| 2012/0066216 A1 | 3/2012 | Alexander | |

OTHER PUBLICATIONS

Notice of Allowance received in U.S. Appl. No. 13/219,076 on May 15, 2013, 14 pages.
Office Action Issued in U.S. Appl. No. 11/756,127 on Sep. 16, 2009, 29 page.
Office Action Issued in U.S. Appl. No. 11/756,127 on Jun. 9, 2010, 48 pages.
Notice of Allowance Issued in U.S. Appl. No. 11/756,127 on Jan. 6, 2011, 13 pages.
Notice of Allowance Issued in U.S. Appl. No. 11/756,127 on May 6, 2011, 9 pages.
A. C. Gilbert, Y. Kotidis, S. Muthukrishnan, and M. Strauss, Surfing wavelets on streams: One-pass summaries for approximate aggregate queries, The VLDB Journal, p. 79-88, 2001.
A. Zhai, P. Huang, and T. J. yu Pan, A study on web-log using wavelet, Research and Development Information Retrieval, 2001.

C. E. Jacobs, A. Finkelstein, and D. H. Salesin "Fast multiresolution image querying," In Proc. of SIGGRAPH'95, ACM, p. 277-286 (1995).
C. E. Jacobs, A. Finkelstein, and D. H. Salesin, Fast multiresolution image querying, Computer Graphics, 29(Annual Conference Series):277-286, 1995.
C. Shahabi, S. Chung, M. Safar, and G. Hajj. 2d TSAtree: A wavelet-based approach to improve the efficiency of multi-level spatial data mining, Statistical and Scientific Database Management, p. 59-68, 2001.
C. Shahabi, X. Tian, and W. Zhao. TSA-tree: A Wavelet-based approach to improve the efficiency of multi-level surprise and trend queries on time-series data, Statistical and Scientific Database Management, p. 55-68,2000.
Chakrabarti et al., "Approximate Query Processing Using Wavelets," Springer-Verlag, New York, 10(2-2):199-223 (2001).
Chien et al., "Semantic Similarity Between Search Engine Queries Using Temporal Correlation," ACM, Proceedings of the 14th International Conference on the World Wide Web, pp. 2-11 (May 10-14, 2005).
Das et al., "Google News Personalization: Scalable Online Collaborative Filtering," Proceedings of the 16th International Conference on World Wide Web, pp. 271-280 (May 8-12, 2007).
J. B. T. M. Roerdink and M. A. Westenberg, Wavelet-based Volume Visualization, Nieuw Archief voor Wiskunde, 17 (2):149-158, 1999.
J. S. Vitter and M. Wang, Approximate computation of multidimensional aggregates of sparse data using wavelets, p. 193-204, 1999.
J.S. Vitter, M. Wang, and B. Iyer, Data cube approximation and histograms via wavelets, Proc. of the 7th Intl. Conf. on Information and Knowledge Management, 1998.
K. Chakrabarti, M. Garofalakis, R. Rastogi, and K. Shim, Approximate query processing using wavelets, VLDB Journal: Very Large Data Bases, 10(2-3):199-223, 2001.
K. pong Chan and A. W.-C. Fu, Efficient time series matching by wavelets, ICDE, p. 126-133, 1999.
S. Chien and N. Immorlica, "Semantic similarity between search engine queries using temporal correlation," In Proc. 14th Int. Conf. on World Wide Web (WWW '05). ACM, New York, NY, USA, 2-11 (2005).
Y. Matias, J. S. Vitter, and M. Wang, Dynamic maintenance of wavelet-based histograms, VLDB'00, Morgan Kaufmann, 2000.
Y. Matias, J. S. Vitter, and M. Wang, Wavelet-based histograms for selectivity estimation, ACM SIGMOD, p. 448-459, ACM Press, 1998.
Y.-L. Wu, D. D Agrawal, and A. E. Abbadi, A comparison of DFT and DWT based similarity search time-series databases, CIKM, p. 488-495, 2000.
Li et al., "A Survey on Wavelet Applications in Data Mining," ACM SIGKDD Explorations Newsletter, 4(2):49-68 (2002).
M. Garofalakis and P. B. Gibbons, Wavelet synopses with erro guarantee, Proceedings of 2002 ACM SIGMOD, Madison, Wisconsin, USA, Jun. 2002, ACM Press.
M. Vlachos, C. Meek, Z. Vagena, and D. Gunopulos. "Identification of similarities, periodicities and bursts for online search queries," In Int. Conf. Mgmt. Data (SIGMOD), Paris, France (2004).
Office Action Issued in U.S. Appl. No. 12/688,006 on Mar. 1, 2013, 29 pages.
Office Action issued in U.S. Appl. No. 12/710,012 on Apr. 5, 2013, 23 pages.
Office Action issued in U.S. Appl. No. 13/615,793 on Apr. 26, 2013, 22 pages.
"Low-Support, High Correlation, Finding Rare but Similar Items Minhashing Locality-Sensitive Hashing, 43 pages."
Jacobs, Charles E. et al., "Fast Multiresolution Image Querying," Department of Computer Science and Engineering, University of Washington, 10 pages.
Narrative Information Disclosure Statement (1 page) and screen shots showing highlighting a phrase from a first web page, "right clicking" to display a dialog box, and selecting a search option, which returns a second web page of search results for the highlighted phrase (2 pages). Jun. 27, 2008.

(56) References Cited

OTHER PUBLICATIONS

Schneider, G., "A low-complexity, broad-coverage probabilistic Dependency Parser for English," Proceeding of HLT-NAACL 2003, Student Research Workshop, pp. 31-36, Edmonton, Canada, May-Jun. 2003.

Silla, Jr., Carlos, N., et al., "An Analysis of Sentence Boundary Detection Systems for English and Portuguese Documents," Proceedings of 5th International Conference CICLing 2004, Seoul, Korea, Feb. 15-21, 2004, pp. 135-141.

Stollnitz et al., "Wavelets for Computer Graphics: A Primer, Part 1," IEEE Computer Graphics and Applications, 15(3): 76-84, May, 1995, pp. 1-8.

Stollnitz et al., "Wavelets for Computer Graphics: A Primer, Part 2," IEEE Computer Graphics and Applications, 15(4): 75-85, Jul. 1995, pp. 1-9.

Office Action issued in U.S. Appl. No. 12/163,925 on Dec. 19, 2012, 25 pages.

Office Action issued in U.S. Appl. No. 12/163,925 on Jun. 15, 2011, 16 pages.

Office Action issued in U.S. Appl. No. 12/163,925 on Mar. 15, 2012, 16 pages.

Office Action issued in U.S. Appl. No. 12/688,006 in Jul. 26, 2012, 22 pages.

Office Action issued in U.S. Appl. No. 12/710,012 on Feb. 16, 2012, 16 pages.

Office Action issued in U.S. Appl. No. 12/710,012 on Jul. 2, 2012, 14 pages.

Office Action issued in U.S. Appl. No. 13/219,076 on Jun. 28, 2012, 57 pages.

Office Action issued in U.S. Appl. No. 13/219,076 on Nov. 10, 2011, 45 pages.

\* cited by examiner

IDENTIFYING RELATED QUERIES

CROSS-REFERENCE TO RELATED APPLICATIONS

This application is a continuation of U.S. patent application Ser. No. 13/219,076, filed Aug. 26, 2011, which is a continuation of U.S. patent application Ser. No. 11/756,127, filed May 31, 2007, now U.S. Pat. No. 8,019,742. The contents of the prior applications are hereby incorporated by reference in their entirety.

FIELD

The following disclosure relates to information retrieval.

BACKGROUND

Locating a desired portion of information on the World Wide Web ("web") can be challenging because the amount of information available. Query processing systems permit a user to search information on the web, and attempt to return search results that are relevant to a search query provided by the user. The goal of a query processing system is to provide links to high quality, relevant search results (e.g., links to web pages) to the user based on the search query.

SUMMARY

According to one aspect, there is disclosed a method. The method can include receiving a first search query and a second search query, generating a first image based on the first search query, and a second image based on the second search query, and determining if the first search query and the second search query are related by comparing the first image to the second image.

One or more of the following features may also be included. The method can include determining a query volume associated with the first search query during a period of time, and a query volume associated with the second search query during the period of time. Determining if the first search query and the second search query are related can include determining that the first search query and the second search query are related when the query volume associated with the first search query and the query volume associated with the second search query exhibit a similar rise or decrease during the period of time. Generating a first image based on the first search query, and a second image based on the second search query can include generating the first image based on the query volume associated with the first search query, and generating the second image based on the query volume associated with the second search query.

According to another feature, determining if the first search query and the second search query are related can include determining that the first search query and the second search query are related when the first image and the second image exhibit similar rises or decreases in query volume during the period of time. Determining a query volume associated with the first search query, and a query volume associated with the second search query can also include determining the query volume associated with the first search query based on the search volume of the first search query relative to all queries during the period of time, and determining the query volume associated with the second search query based on the search volume of the second search query relative to all queries during the period of time. Additionally, the method can include displaying that the first search query and the second search query are related.

According to another aspect, there is a method that includes generating a first image based on a first search query, generating a second image based on a second search query, processing the first image to generate a first set of wavelets corresponding to the first image, processing the second image to generate a second set of wavelets corresponding to the second image, and determining if the first search query and the second search query are related by comparing at least some of the first set of wavelets to at least some of the second set of wavelets.

According to a feature, the method can include identifying a first subset of top wavelets from the first set of wavelets, and identifying a second subset of top wavelets from the second set of wavelets. Determining if the first search query and the second search query are related can include determining if the first search query and the second search query are related by comparing the first subset of top wavelets to the second subset of top wavelets.

According to yet another aspect, a method is disclosed. The method includes generating a plurality of images, where each image is associated with a respective search query of a plurality of search queries, processing the plurality of images to generate a set of wavelets for each of the plurality of images, and identifying a respective subset of top wavelets for each set of wavelets. The method also includes generating signatures for each of the plurality of images based on the subset of top wavelets for each respective image, and determining if a first search query of the plurality of search queries is related to a second search query of the plurality of search queries by comparing a signature corresponding to the first query to a signature corresponding to the second search query.

According to a feature, generating signatures for each of the plurality of images based on the subset of top wavelets for each respective image includes generating signatures for each of the plurality of images using a min-hash algorithm to compress the subset of top wavelets. Additionally, the method can include identifying at least a portion of signatures for comparison using a hashing scheme, which can be a locality sensitive hashing scheme.

These general and specific aspects may be implemented using a system, a method, or a computer program, or any combination of systems, methods, and computer programs. Aspects of the invention can include none, one or more of the following advantages. Search results can be provided to user based on a user provided query and one or more system identified second queries that are determined to be related. While conventional query processing systems provide search results to users based on their queries, they are ineffective at providing a user with search results based on related queries that may identify relevant search results to the user even though the related queries differ from the user's query.

BRIEF DESCRIPTION OF THE DRAWINGS

Figure 1:
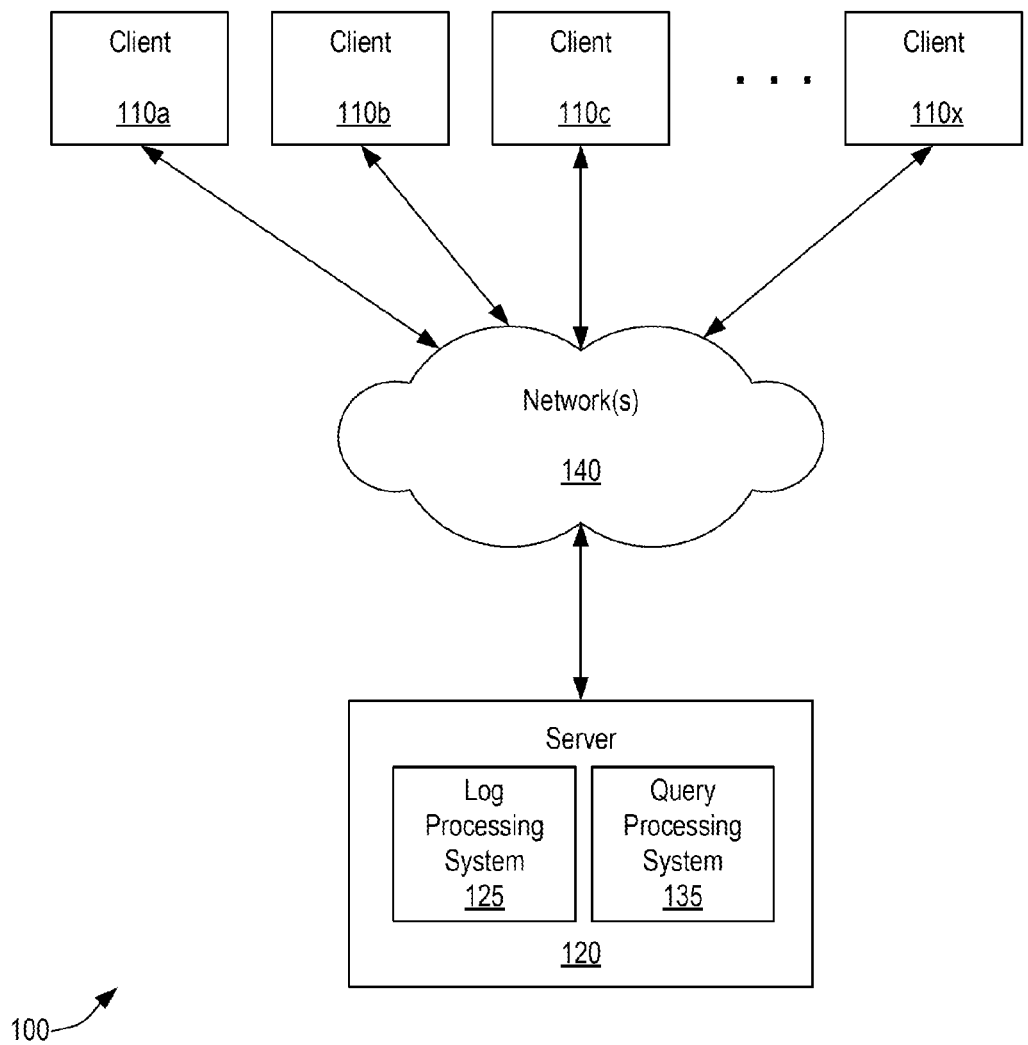

Having thus described the invention in general terms, reference will now be made to the accompanying drawings, which are not necessarily drawn to scale, and wherein:

FIG. 1 shows an example search system.

Figure 2:
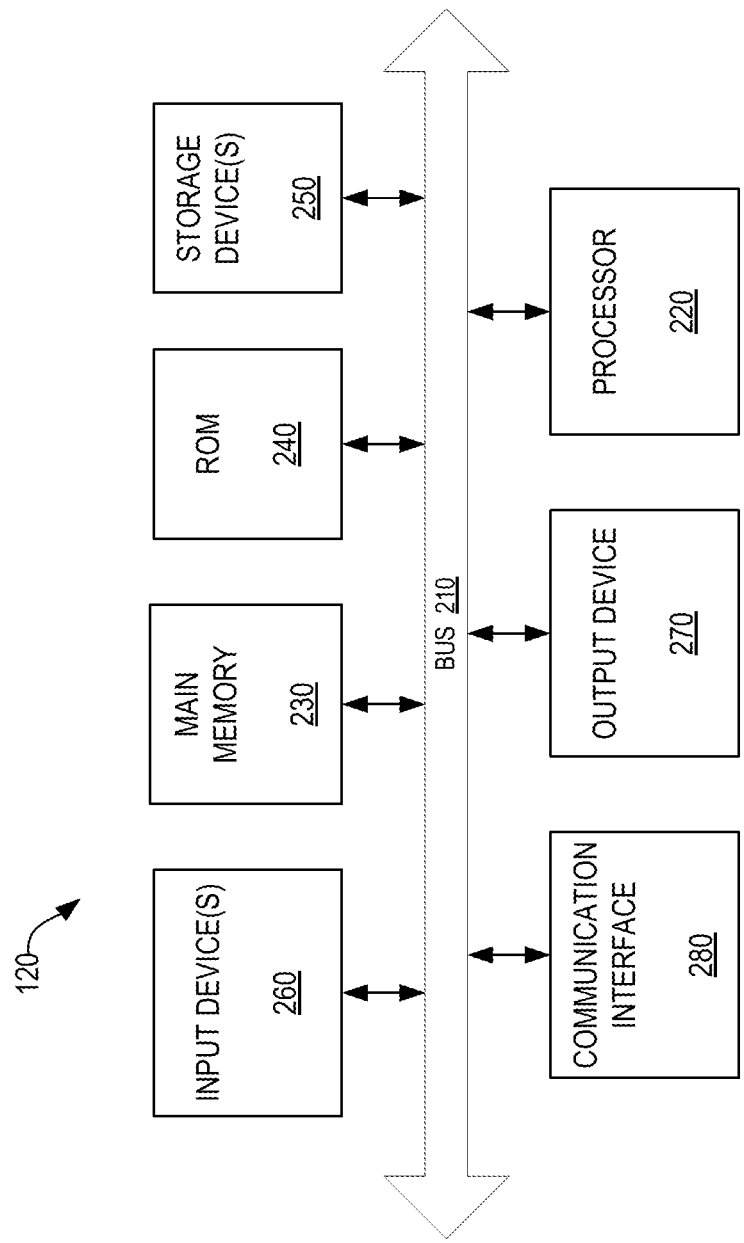

FIG. 2 shows an example server in the search system of FIG. 1, according to an illustrative implementation.

Figure 3:
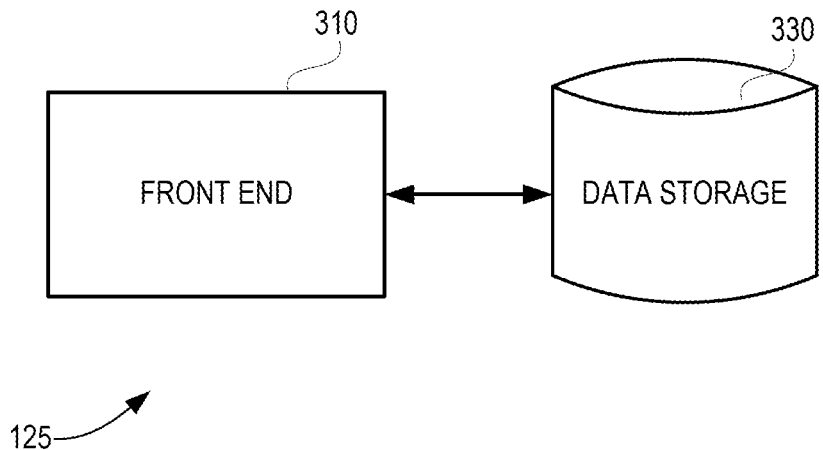

FIG. 3 shows an example log processing system in the search system of FIG. 1, according to an illustrative implementation.

Figure 4:
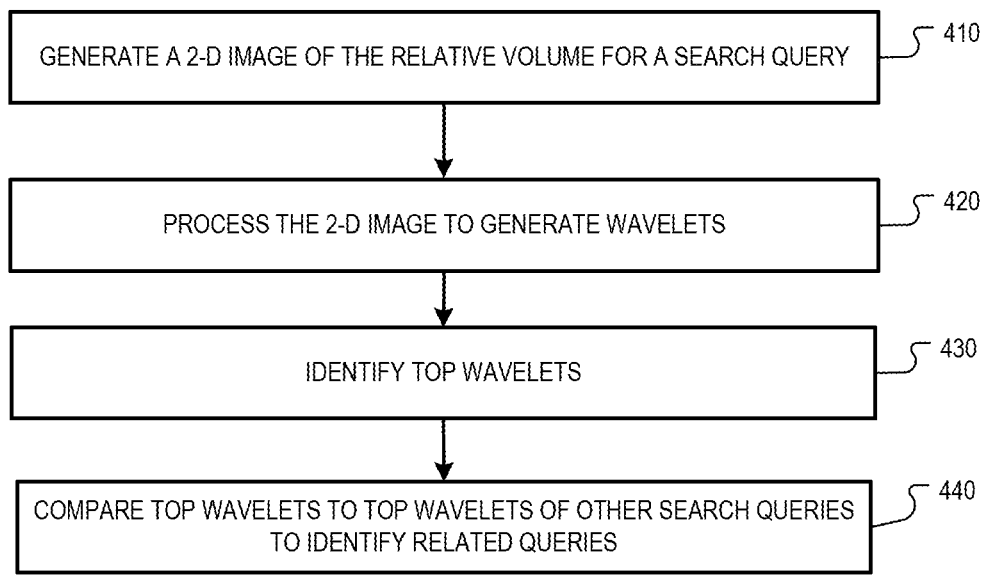

FIG. 4 shows a block diagram flow chart illustrating an example method of identifying related queries, according to an illustrative implementation.

Figure 5:
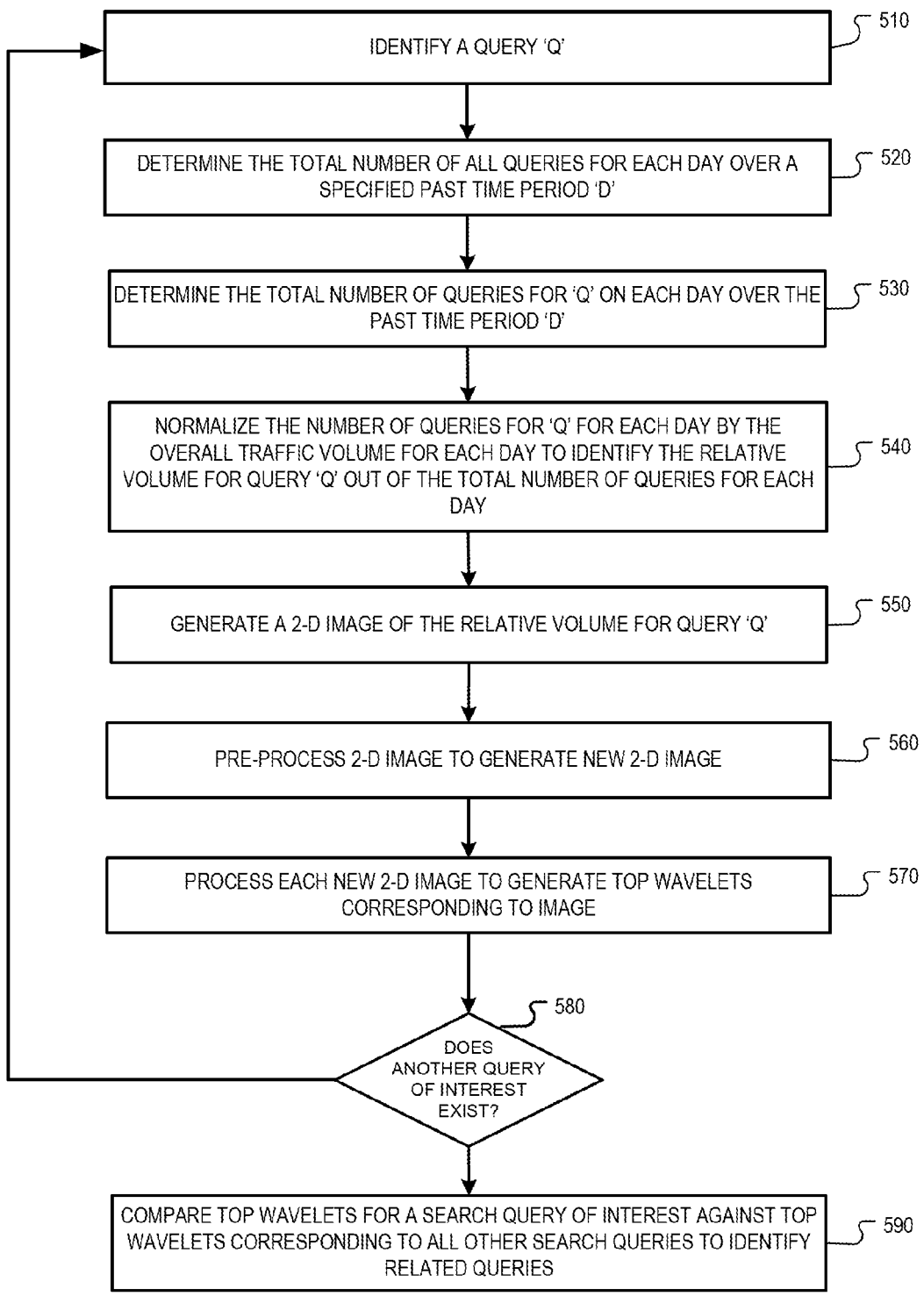

FIG. 5 shows a block diagram flow chart illustrating an example method of identifying related queries, according to another illustrative implementation.

Figure 6:
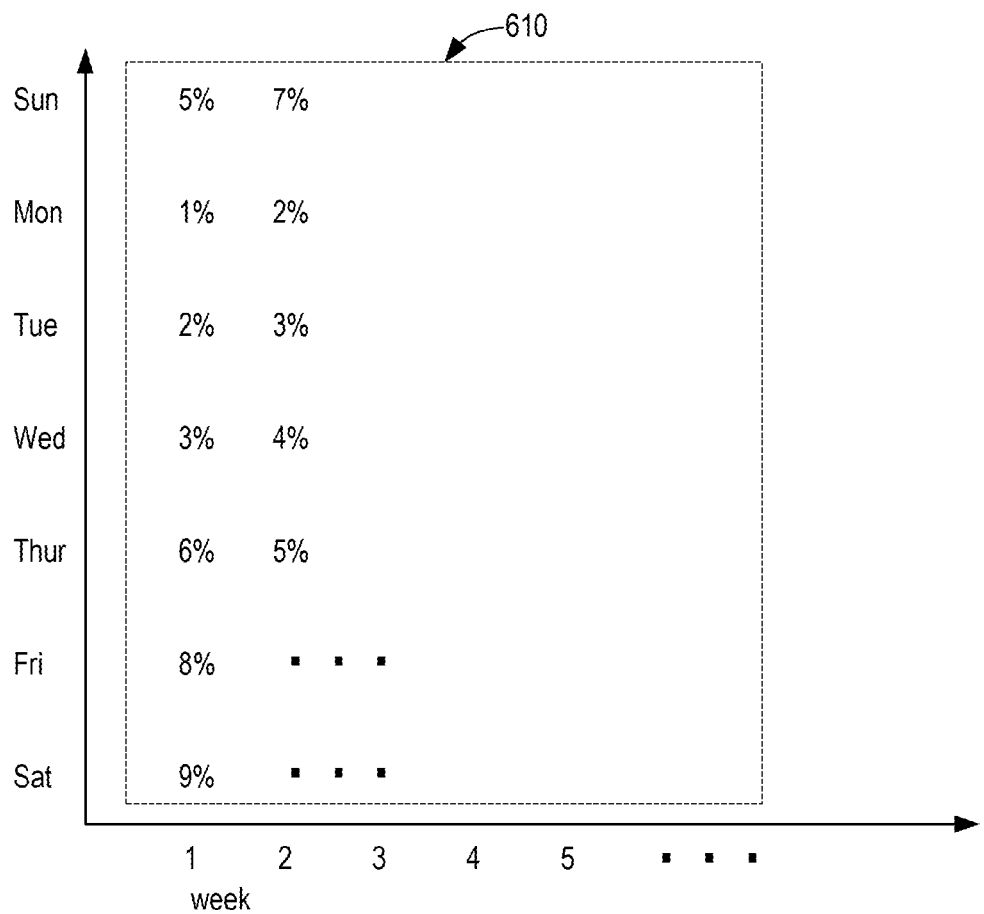

FIG. 6 shows an illustrative 2-D image of relative query volume for a search query, according to an implementation.

Figure 7:
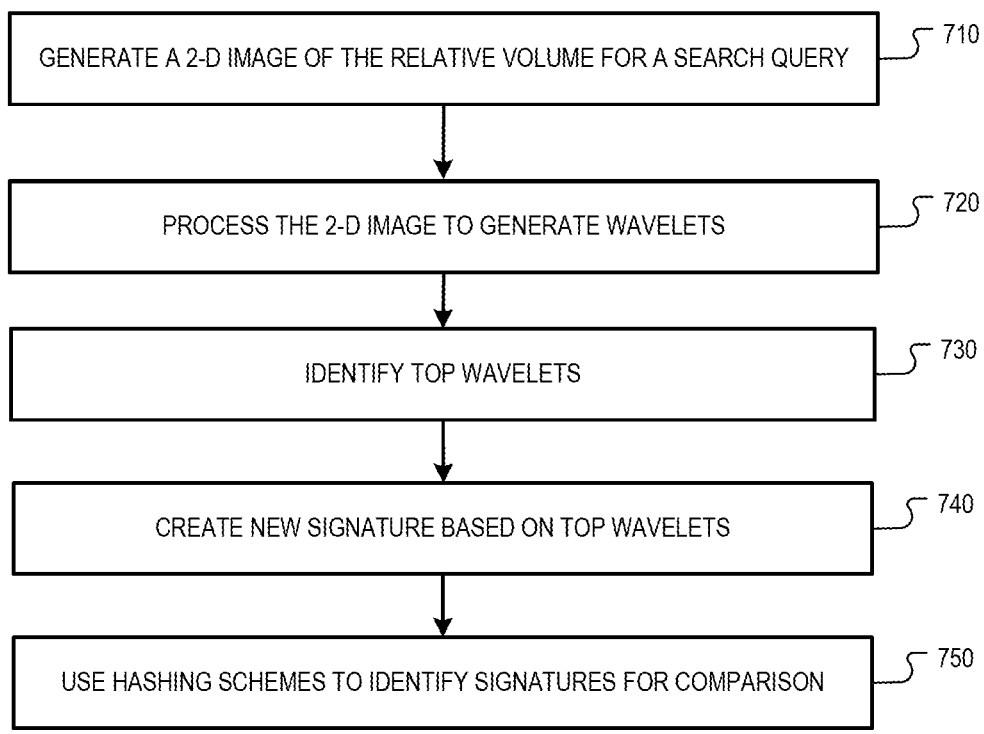

FIG. 7 shows a block diagram flow chart illustrating an example method of identifying related queries, according to another illustrative implementation.

Figure 8:
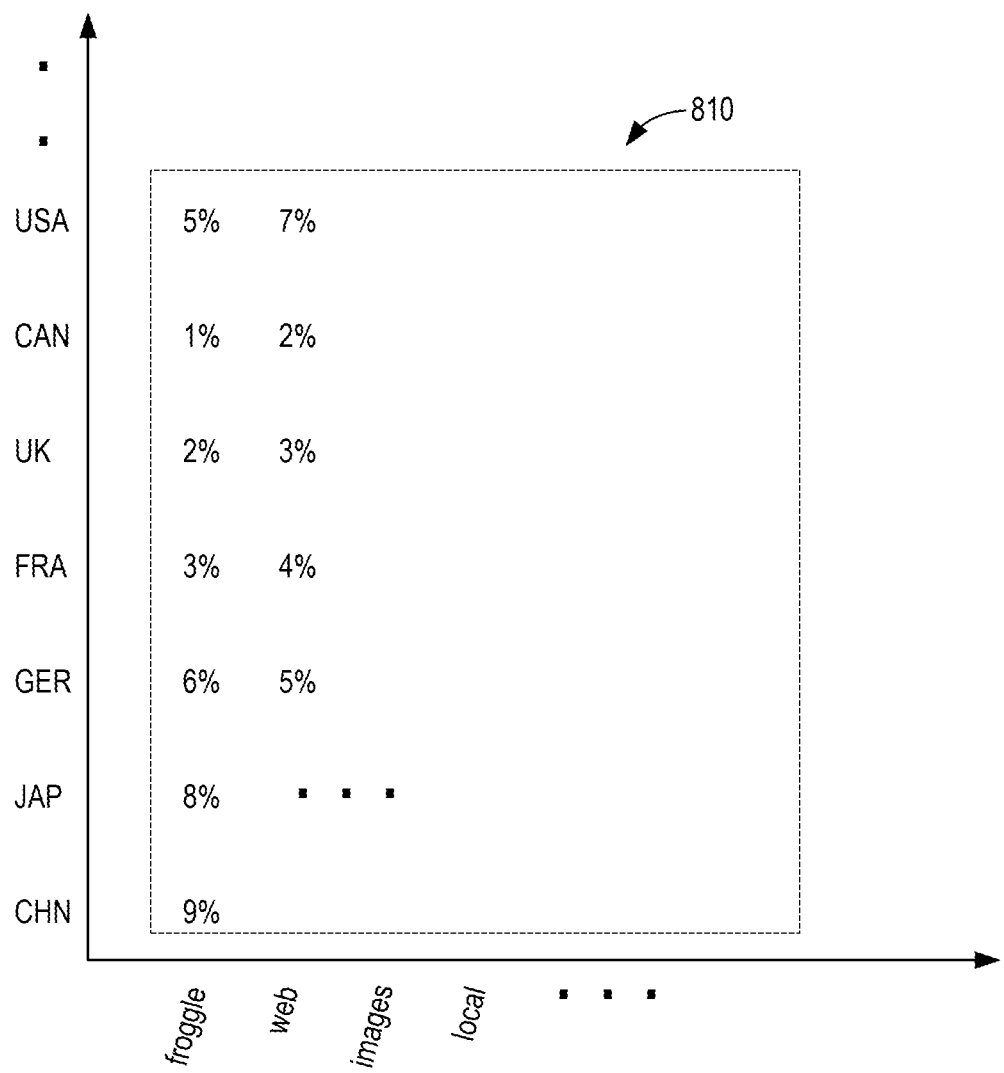

FIG. 8 shows an illustrative 2-D image of relative query volume for a search query, according to another implementation.

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The following disclosure describes systems, methods, and computer program products that can identify related search queries that exhibit similar rises or decreases in volume over a period of time. In this disclosure, the term "site" or "website" includes any domain or subdomain (e.g., google.com, labs.google.com, etc.) or a domain plus a uniform resource locator prefix (e.g., geocities.com/Athens/). Additionally, although the disclosure focuses on searches related to web sites, implementations are also applicable to searching any machine-readable and machine-storable information (e.g., document).

This disclosure is described with reference to block diagrams and flowchart illustrations of methods, apparatuses (i.e., systems) and computer program products. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function(s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the function(s) specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, an example search system 100 is shown according to an illustrative implementation. The system 100 includes clients 110a, 110b, 110c, . . . 110x in communication with a server 120 via one or more networks 140. Although multiple clients 110a, 110b, 110c, . . . 110x and a single server 120 are illustrated in FIG. 1, there can be more servers and more or fewer clients. For instance, some of the functions performed by the server 120 can be performed by one or more other servers such that the server 120 can represent several devices, such as a network of computer processors and/or servers. Additionally, in some implementations a client can perform a function of the server 120 and the server 120 can perform a function of a client. Other architectures, i.e., non client server, are possible.

The clients 110a, 110b, 110c, . . . 110x can include a device, such as a personal computer, a wireless telephone, a personal digital assistant (PDA), a lap top computer, or another type of computation or communication device, a thread or process running on one of these devices, and/or an object executable by one of these devices. The server 120 can include one or more servers that gather, process, maintain, manage information and/or provide search results to users. In an example implementation, the server 120 can include a log processing system 125 that processes and stores information associated with, for example, search queries, such as search queries input by clients' 110a, 110b, 110c, . . . 110x. The server 120 can also include a query processing system 135 usable by the clients 110a, 110b, 110c, . . . 110x. The query processing system 135 can identify search queries and determine those related search queries, e.g., those having similar rises or decreases in volume.

The network(s) 140 can include one or more local area networks (LANs), wide area networks (WANs), telephone networks, such as the Public Switched Telephone Network (PSTN), intranets, the Internet, and/or or other type of network. The clients 110a, 110b, 110c, . . . 110x and server 120 can connect to the network(s) 140 via wired, wireless, or optical or other connections. In alternative implementations, one or more of the devices illustrated in FIG. 1 are directly connected to another one of the devices. For example, in one implementation, the clients 110a, 110b, 110c, . . . 110x are directly connected to the server 120.

FIG. 2 shows the server 120 of FIG. 1, according to an illustrative implementation. The server 120 can include a bus 210, a processor 220, a main memory 230, a read only memory (ROM) 240, a storage device 250, one or more input devices 260, one or more output devices 270, and a communication interface 280. The bus 210 can include one or more paths that permit communication among the components of server 120.

The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

The server 120 can also include an input device 260 having one or more conventional mechanisms that permit a user to input information to the server 120, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the server 120 to communicate with other devices and/or systems. For example, the communication interface 280 can include mechanisms for communicating with another device or system via one or more networks, such as the network(s) 140.

In operation the server 120 can store data associated with individual search queries and/or search results (e.g., web pages) and can perform searches based on inputs from clients 110a, 110b, 110c, . . . 110x. In one implementation, the server 120 performs these operations in response to the processor 220 executing software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this disclosure. Alternatively, hardwired circuitry can be used in place of or in combination with software instructions to implement processes consistent with the disclosure. Thus, implementations are not limited to any specific combination of hardware circuitry and software.

FIG. 3 is a functional block diagram of an example log processing system 125 of FIG. 1, according to an illustrative implementation. The log processing system 125 can include a front end 310 and a data storage 320. The logical blocks illustrated in FIG. 3 can be implemented in software, hardware, or a combination of hardware and software. In addition, each of the functional blocks can represent one or more computer processors, threads, and/or objects. It should also be understood that in alternative implementations, the functions performed by one of the blocks in FIG. 3 can be performed by another block. In other implementations, a single logical block/processing device can perform at least some of the functions of the log processing system 125.

The front end 310 receives information associated with clients' 110a, 110b, 110c, . . . 110x input of search queries and/or access of various web pages/sites. For example, the front end 310 can receive search queries when a client 110a, 110b, 110c, . . . 110x inputs a search query into a search engine, such as Google®. The front end 310 can forward this information to the data storage 320, which can store the search queries. For example, the data storage 320 can include information identifying search queries that have been entered by clients 110a, 110b, 110c, . . . 110x. The data storage 320 can also store information indicating a total number of times each of the search queries has been entered by clients 110a, 110b, 110c, . . . 110x and/or the particular times and/or dates the search queries have been entered. For instance, the data storage 320 can include the total number of queries for each day, and the total number of times a particular search query has been entered in a given day. The data storage 320 can store this search query and/or related information corresponding to a past period of time, such as 30 days, a year, or the like.

Alternatively, or in addition to the information described above, the data storage 320 can store a list or ranking of top search queries.

FIG. 4 shows a block diagram flow chart illustrating an example method of identifying related queries, according to an illustrative implementation. In particular, the method permits the identification of search queries that exhibit similar rises or decreases in volume over a period of time. The method begins with the generation of a 2-D image representing the relative volume of a search query (block 410). The relative volume represented may include the relative volume of the search query over a period of time. Next, the 2-D image is processed to generate wavelets representing the 2-D image (block 420). One example method for generating wavelets is described in 'Wavelets for computer graphics: A primer, part 1', by Eric J. Stollnitz, Tony D. DeRose, and David H. Salesin, IEEE Computer Graphics and Applications, 15(3): 76-84, May 1995, the contents of which are incorporated by reference. Top wavelets, which include high magnitude coefficients and/or represent significant characteristics of the 2-D image, are identified (block 430). The top wavelets corresponding to the 2-D image are compared to the top wavelets of other search queries to identify related queries (block 440). According to an implementation, once identified, related queries for a particular query entered by a user may be displayed to the user, and/or search results for the related query may be provided to the user along with the search results for the query entered by the user.

FIG. 5 shows a block diagram flow chart illustrating an example method of identifying related queries, according to another implementation. According to an implementation, the method can be implemented by the server 120 of FIG. 1. A search query of interest is identified, where the search query is referenced as 'Q' in FIG. 5 for convenience (block 510). The search query 'Q' can be received at the server 120 from one of more clients 110a, 110b, 110c, . . . 110x and optionally stored by the log processing system 125 within the data storage 330. According to an implementation, the search query 'Q' can be identified by the query processing system 135 of the server 120. The query processing system 135 can identify the search query 'Q' as a query of interest, for instance, as a search query stored in the data storage 330 that ranks as a top search query received from the one or more clients 110a, 110b, 110c, . . . 110x. As an illustrative example, the query processing system may identify the search query 'Q' as one of the top 1,000,000 search queries stored in a list or ranking of search queries received by the server 120.

Next, the total number of all search queries for each smallest-desired-time unit 'H' (e.g., one day) over a specified past time period 'D' are identified (block 530). According to an implementation, the query processing system 135 can collect and/or tally the total number of queries for each time unit 'H' over a specified past time period from information stored within the data storage 330 of the log processing system 125. The number of time units 'H' for which the total number of queries are collected may vary, such as 30 days, 90 days, a year, or the like. According to an implementation, the number of time units 'H' are adjustable by a user associated with a client 110a, 110b, 110c, . . . 110x or an administrator associated with the server 120. The number 'D' of time units 'H' establishes a historical window for which search queries will be examined to identify search queries exhibiting similar rises or decreases in volume.

The total number of queries for search query 'Q' during each time unit 'H' over the specified past time period 'D' is identified (block 530). According to an implementation, the query processing system 135 can collect and/or tally the total number of queries for search query 'Q' for each time unit 'H' over the specified past time period from information stored within the data storage 330 of the log processing system 125.

Next, the number of queries for search query 'Q' for each time unit 'H' are normalized by, for example, the queries-per-time-unit for that day (block 540) to identify the relative volume for the search query 'Q' out of the total volume. Normalizing permits the identification of increases and decreases for a search query by eliminating the effects of increasing query volumes. For instance, on a particular hour, there may be 10 requests for search query 'Q' out of a total of 100 search queries/hour for that day, where a request for search query 'Q' represents 10% of search queries. At the same hour on a different day, there may be 20 requests for search query 'Q' out of a total of 1000 search queries/hour for that day, such that requests for the search query 'Q' represents only 2% of search queries. Although the number of search queries for 'Q' rise from 10 to 20 in the above examples, the relative volume of search queries for 'Q' decline from 10% to 2%. According to an implementation, the normalization can be implemented by the query processing system 135.

A two-dimensional image is generated of the relative query volume for the search query 'Q', which represents the percentage of the total volume of queries that the search query 'Q' represented across a period of time (block 550). According to an implementation, the two-dimensional image illustrates the percentage of total volume of a search query 'Q' across the past time period 'D'. The two-dimensional image can be generated by the query processing system 135. FIG. 6 shows an illustrative graph 600 including a two dimensional image 610 illustrating the relative query volume for a search query 'Q'. Although the two dimensional image 610 shown in FIG. 6 includes the relative query volume, in percentage points, for a particular search query on each time unit 'H' over the course of several weeks, the two dimensional image 610 can alternatively be illustrated by a 3-D surface, histogram, 2-D line, line graph, bar graph, or other image that graphically illustrates relative query volume over a period of time.

According to an implementation, the query processing system 135 pre-processes each 2-D image by blurring the images (block 560). Blurring an image creates a new, processed image from the original 2-D image where each pixel in the new image is a weighted average of the original pixel and its neighboring pixels. This process softens the hard edges of an image, which aids in matching processes so that edges (and thus image contents) do not have to be exactly aligned for a match to be identified. According to another implementation, the query processing system 135 can effect blurring of an original 2-D image by applying a Gaussian blur filter or convolving the image with a small sub-image that will weight an original pixel value based on the value of each of its surrounding neighbors. For instance, convolving an image with the sub-image

| | | |
|---|---|---|
| 1 | 1 | 1 |
| 1 | 5 | 1 |
| 1 | 1 | 1 | will weight the original pixel's value as 5× the value of each of its surrounding eight neighbors. Larger sub-images may be used that take into account more neighbors, and different weightings may also be used.

According to an implementation, each pre-processed image is processed to generate wavelets to represent the image (block 570). Wavelets are a known mathematical tool for hierarchically decomposing functions, and can be used to represent a 2-D image. The top wavelets for each pre-processed image are identified (block 570). The top wavelets are those wavelets that have high magnitude coefficients, and which represent the main characteristics of the image. According to an implementation, the top wavelets include those whose magnitude exceeds a threshold value. The threshold value can be automatically determined as a function of the size of an image or may encompass a top percentage of the wavelets. For instance, the threshold value may be set to include the top 10% of the wavelets. According to another implementation, the threshold value may be manually set, such as the top 100 wavelets.

The top wavelets can be represented as quantized top wavelets that represent a binary vector (block 580), where the top wavelets can be represented by a limited number of bits. According to an implementation, 2 bits are assigned to every wavelet coefficient. To effect this, the coefficients can be sorted based on their magnitude, irrespective of whether the coefficient is positive or negative. If a top wavelet is positive, it is assigned a value of 01, and if it is negative it is assigned a value of 10. Wavelets that do not exceed a threshold value are assigned a value of 00. According to another implementation, more bits can be used to identify whether wavelets exceed additional threshold values. For instance, 3 or more bits may be used and assigned to wavelets based on whether the wavelet is positive, negative, and/or exceeds two or more threshold values.

According to another implementation, after the top wavelets can be identified, the top wavelets can be subjected to another combination of transformation and quantization to extract a description of the 2-D pre-processed image. For instance, an alternative transformation could be effected by removal, variance normalization and projection using a PCA (Principal Components Analysis) basis learned from data derived from a previous time period. An illustrative example of an alternative quantization is a 5-level quantization defined by each coefficients' expected percentile values. For instance, 10%, 30%, 70%, and 90% could be the dividing lines for the quantization levels represented by −2, −1, 0, 1, 2.

According to an implementation, the generation of quantized top wavelets for queries (blocks 510, 520, 530, 540, 550, 560, 570) is performed for each search query of interest (block 580), such as search queries identified in a list or ranking of search queries received by the server 120. The quantized top wavelets for each query of interest can be stored in memory, for instance, the data storage 330.

Next, the quantized top wavelets for the particular query are compared with all of the quantized top wavelets associated with other search queries (block 590). According to an implementation, this may be performed by the log processing system 125. In one implementation, a related query to the particular query is determined by identifying the stored query in the database that includes the most similar top wavelets (i.e., coefficients) to the particular query (block 590). To effect the comparison, the binary vectors representing the quantized top wavelets are compared against other binary vectors to identify the bit positions that are similar or different. Similar binary vectors differ in fewer bit positions that vectors that differ. According to an implementation, the queries that are most similar may be ranked in terms of their similarity, and a threshold value can be used to identify those queries that are deemed similar. For instance, the top 5 or 10 percent of vectors, ranked in terms of their similarity, may be deemed to be similar queries.

FIG. 7 shows a block diagram flow chart illustrating an example method of identifying related queries, according to another illustrative implementation. The method begins with the generation of a 2-D image representing the relative volume of a search query (block 710). The 2-D image is then processed to generate wavelets representing the 2-D image (block 720). The top wavelets are identified (block 730). To reduce the number of images that must be compared to a particular query of interest to identify related queries for that query, signatures are generated based on the top wavelets (block 740).

According to an implementation, a Min-Hash algorithm may be used to create the signature by compressing the number of top-wavelets. For instance, for each top-wavelet vector, a binary vector (i.e., a row of 0/1 numbers) can be generated, with a '0' in position 'I' if the wavelet-I is not within a top number of wavelets, such as within the top 1000 wavelets for an image. If the wavelet-I is within the top number of wavelets, position 'I' can be a '1' value. Next, an arbitrary value for reducing the number of top wavelets is selected, such as 50 or 100, which is used to identify the independent permutations of the generated rows. For each permutation, the first row position in which there is a 1 is identified. The value of the first position can be concatenated and used as the new signature of an image. According to an implementation, the process of creating a new signature may be implemented by the log processing system 125 and new signatures may be stored in the data storage 330.

After the new signatures are generated corresponding to each search query to be compared, one or more hashing schemes can be used to identify those signatures that should be compared to identify related queries (block 750). According to an implementation, a locality-sensitive hashing (LSH) scheme can be implemented, for instance, by the log processing system 125. LSH selects small, random, but non-overlapping members of the signature and hashes them into bins repeatedly (for instance, 10 or 20 times) to ensure that no member of a signature is used twice. With each query, the same division of signatures is used to effect the hashing. As an illustrative example, if the first members of a signature that are hashed are from positions 1, 5, 8, 10, 91, and 101, then every query will have members from those same positions that are hashed. According to an implementation, each set of hashes are stored in their own hash table, such that the number of hash sets corresponds to the number of hash tables, and every query includes a subset of members hashing to the same number of hash tables. Using this technique, which may be implemented by the log processing system 125, permits a signature associated with a particular query of interest to be compared against a small number of signatures (associated with other search queries) in matching bins instead of all signatures. The bins, according to an implementation, are stored within the data storage 330.

As an illustrative example, if a new search query has a signature that is hashed into 20 hash tables, queries within each of the locations of the 20 hash tables are examined. Using this process the system can determine those queries that are most often identified within the same hash tables. Where a query is located in many of the same hash tables, it is likely that the query has many of the same values in many of the same hash positions, which results in the system determining that the a query is related to the new search query.

Although the above implementations are described with respect to a 2-D image, images of other dimensions can also be implemented and used to identify related queries using the techniques described herein. For instance, a 1-dimensional image could be used, such as a 1-dimensional image illustrating the relative query volume of a particular query for each day of a week. A 3-D dimensional image could be used to break down the relative volume of a query based on weeks (one axis), days (second axis), and hours of the day (third axis). Still other variables may be used to create 4 or 5 dimensional images. For instance, a 4-D dimensional image could include the same axis described in the 3-D image, plus an additional axis representing the countries of origin for a search query. Yet another variable could be represented by a $5^{th}$ axis to generate a 5-D dimensional image, such as a property or origin of the query. For instance, a Google™ query may be defined as a froogle query, web query, image query, or the like.

FIG. 8 shows an illustrative 2-D image 810 of relative query volume for a search query, according to another implementation. The 2-D image 810 of FIG. 8 does not include a time axis because the 2-D image corresponds to a particular period of time, such as a day, hour, or week. A series of 2-D images like the illustrative 2-D image 810 of FIG. 8 permits the matching of multiple images for each query without utilizing time as an image axis. This permits the matching of queries illustrating similar volume decreases or increases but not necessarily at the same time. For instance, two seemingly unrelated search queries run at different times of the year may exhibit the same query volume trends even though the search queries are temporally shifted.

It will be apparent to one of ordinary skill in the art that aspects of the invention, as described above, can be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

That which is claimed:

1. A computer-implemented method, comprising:
generating a first image based on a first search query;
generating a second image based on a second search query;
generating a first set of wavelets corresponding to the first image;
generating a second set of wavelets corresponding to the second image;
generating a first signature for at least some of the wavelets corresponding to the first image;
generating a second signature for at least some of the wavelets corresponding to the second image; and
determining whether the first search query and the second search query are related queries based on comparing at least part of the first signature and at least part of the second signature.

2. The method of claim 1, wherein the at least some wavelets corresponding to the first image are wavelets corresponding to first image that have a magnitude that is greater than a predetermined threshold.

3. The method of claim 1, wherein the at least some wavelets corresponding to the first image are n wavelets corresponding to the first image that have the greatest magnitude, wherein n is an integer.

4. The method of claim 1, further comprising:
identifying the at least part of the first signature and the at least part of the second signature using at least one hashing scheme.

5. The method of claim 4, wherein the at least one hashing scheme includes a Min-Hash algorithm.

6. The method of claim 4, wherein the at least one hashing scheme includes a locality-sensitive hashing algorithm.

7. A system, comprising:
one or more computers including one or more storage devices storing instructions that when executed by the one or more computers cause the one or more computers to perform operations comprising:
generating a first image based on a first search query;
generating a second image based on a second search query;
generating a first set of wavelets corresponding to the first image;
generating a second set of wavelets corresponding to the second image;
generating a first signature for at least some of the wavelets corresponding to the first image;
generating a second signature for at least some of the wavelets corresponding to the second image; and
determining whether the first search query and the second search query are related queries based on comparing at least part of the first signature and at least part of the second signature.

8. The system of claim 7, wherein the at least some wavelets corresponding to the first image are wavelets corresponding to the first image that have a magnitude that is greater than a predetermined threshold.

9. The system of claim 7, wherein the at least some wavelets corresponding to the first image are n wavelets corresponding to the first image that have the greatest magnitude, wherein n is an integer.

10. The system of claim 7, wherein the operations comprise:
identifying the at least part of the first signature and the at least part of the second signature using at least one hashing scheme.

11. The system of claim 10, wherein the at least one hashing scheme includes a Min-Hash algorithm.

12. The system of claim 10, wherein the at least one hashing scheme includes a locality-sensitive hashing algorithm.

13. A non-transitory computer-readable storage medium encoded with a computer program, the computer program comprising instructions that, when executed by data processing apparatus, cause the data processing apparatus to perform operations comprising:
generating a first image based on a first search query;
generating a second image based on a second search query;
generating a first set of wavelets corresponding to the first image;
generating a second set of wavelets corresponding to the second image;
generating a first signature for at least some of the wavelets corresponding to the first image;
generating a second signature for at least some of the wavelets corresponding to the second image; and
determining whether the first search query and the second search query are related queries based on comparing at least part of the first signature and at least part of the second signature.

14. The medium of claim 13, wherein the at least some wavelets corresponding to the first image are wavelets corresponding to the first image that have a magnitude that is greater than a predetermined threshold.

15. The medium of claim 13, wherein the at least some wavelets corresponding to the first image are n wavelets corresponding to the first image that have the greatest magnitude, wherein n is an integer.

16. The medium of claim 13, wherein the operations comprise:
identifying the at least part of the first signature and the at least part of the second signature using at least one hashing scheme.

17. The medium of claim 16, wherein the at least one hashing scheme includes a Min-Hash algorithm.

18. The medium of claim 16, wherein the at least one hashing scheme includes a locality-sensitive hashing algorithm.

* * * * *

UNITED STATES PATENT AND TRADEMARK OFFICE
CERTIFICATE OF CORRECTION

Page 1 of 1

PATENT NO. : 8,732,153 B1
APPLICATION NO. : 13/616893
DATED : May 20, 2014
INVENTOR(S) : Shumeet Baluja and Michele Covell It is certified that error appears in the above-identified patent and that said Letters Patent is hereby corrected as shown below:

On Title Page 2, Column 2 (Other Publications), Line 45, delete "D.D. Agrawal," and insert -- D. Agrawal, --, therefor.

In the Claims:

In Column 10, Line 56, in Claim 2, delete "to first" and insert -- to the first --, therefor.

Signed and Sealed this
Fourteenth Day of October, 2014

Michelle K. Lee
*Deputy Director of the United States Patent and Trademark Office*